Nov. 15, 1966  V. G. MATTO ETAL  3,285,548
HOUSING FOR COMPONENT

Filed Dec. 31, 1964  3 Sheets-Sheet 2

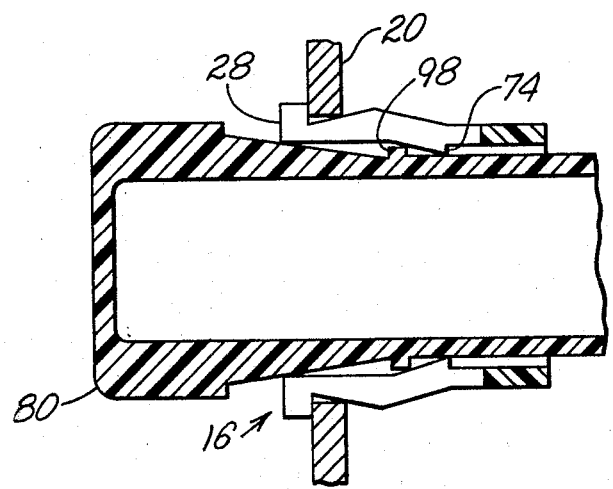
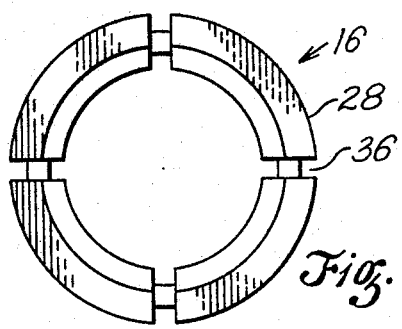
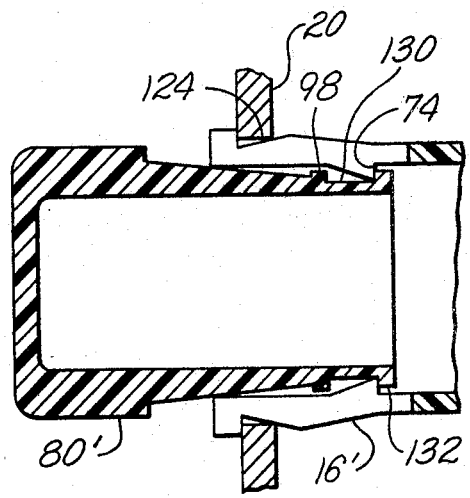
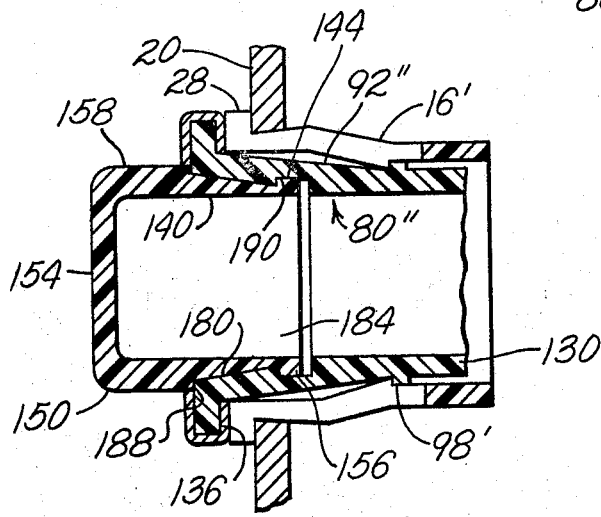

United States Patent Office 3,285,548
Patented Nov. 15, 1966

3,285,548
HOUSING FOR COMPONENT
Victor G. Matto, 54 Jefferson Ave., Tenafly, N.J., and
Emil W. Riegel, 1709 Bergenline Ave., Union City, N.J.
Filed Dec. 31, 1964, Ser. No. 422,733
10 Claims. (Cl. 248—27)

This invention relates to apparatus for housing and supporting electronic or mechanical components on a panel, circuit board, or the like.

One form of apparatus to which the present invention relates is the housing for a pilot light of the type used to indicate the on or off state of an instrument. A light of this type is generally mounted in a suitable socket carried on the instrument panel, with the light being enclosed by a jewel.

There are many types of sockets and housings for supporting a pilot light or the like on a panel, and the problem of inserting the socket or support and locking it in place on a panel is solved in many different ways. For example, some devices use auxiliary locking rings, and others have small ribs which are used to engage and grip the panel. However, none of these structures provides completely satisfactory locking engagement with the panel, combined with easy access for insertion and removal of a component.

Accordingly, the objects of the present invention concern the provisions of a new and improved socket or housing having means for locking it in place on a panel and for carrying an electronic or mechanical component.

Briefly, apparatus embodying the invention includes a first cylindrical member which is adapted to be inserted in a panel and which includes means for holding it securely in place on the panel. The first member is adapted to carry a pilot light or any other suitable component. An auxiliary member is provided to be inserted into the cylindrical member, and both members are so shaped that, when they are coupled together, they bear against each other and apply complementary forces to each other such that the entire assembly is locked securely in place on the panel.

The invention is described in greater detail by reference to the drawing, wherein:

FIG. 4 is a sectional, elevational view of the apparatus shown in FIG. 3 but partly assembled;

FIG. 5 is a front end view of a portion of the apparatus shown in FIG. 3;

FIG. 6 is a sectional, elevational view of the apparatus of FIG. 2 showing the appartus partly disassembled; and FIG. 7 is a sectional, elevational view of a modification of the apparatus of FIG. 1.

Figure 1:
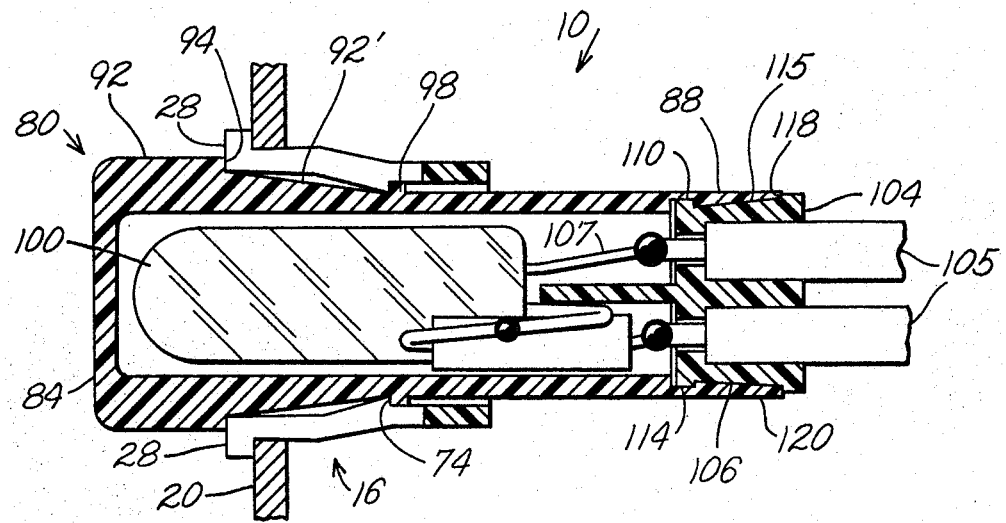
FIG. 1 is a sectional, elevational view of the apparatus of the invention shown assembled as a unit.

The support assembly or socket housing 10 of the invention includes a sleeve or grommet 16 which is adapted to be inserted in and locked in a suitable support member 20, for example, a panel, printed circuit board, or the like, hereinafter called a panel. The sleeve 16 is preferably made of an insulating material such as nylon or some other synthetic resinous material or the like. The sleeve 16 is generally cylindrical and includes an open front end 24 defined by a lip 28 and an open rear end 32. The wall of the sleeve 16 includes a plurality of longitudinal slots 36 which extend a distance rearwardly from the front end 24 to near the rear end 32. The slots 36 permit expansion and contraction of the sleeve 16 as required in use. The lip 28 at the front end of the sleeve is adapted to bear against the top surface of the panel 20.

Figure 3:
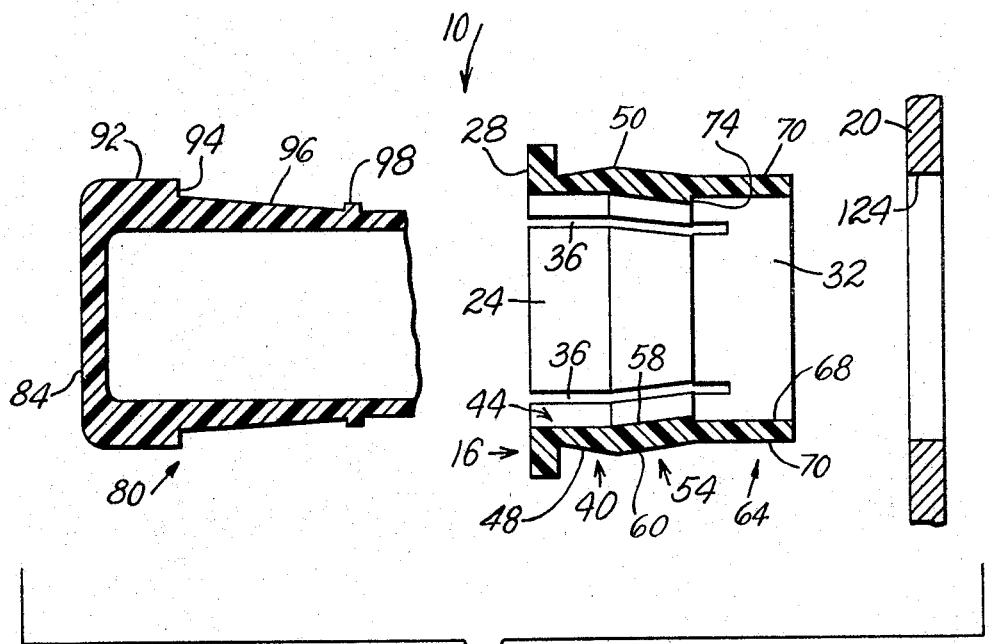
FIG. 3 is an exploded view, in section, of the apparatus of FIG. 1 and a portion of a panel on which it may be mounted.

The wall of the sleeve 16 includes several portions of different thicknesses and taper. Referring to FIG. 3 and beginning at the front end 24, the first portion 40 of sleeve 16 includes an inner surface 44 which extends rearwardly from the front open end and is parallel to the axis of the sleeve. The outer surface 48 of this portion of the sleeve, beginning back of lip 16, tapers outwardly to a maximum represented by numeral 50 so that this portion of the wall of the sleeve increases in thickness. The next portion 54 of the sleeve has a wall portion of substantially uniform thickness, with the inner and outer surfaces 58 and 60, respectively, being substantially parallel to each other. However, the wall of this second portion is slanted slightly toward the longitudinal axis of the sleeve. The third and final portion 64 of the sleeve 16 is generally cylindrical with inner and outer walls 68 and 70, respectively, which are parallel to the axis of the sleeve. This third portion is of reduced thickness and its outer wall is substantally continuous with the outer wall of the second portion. However, the inner wall is undercut to provide the reduced wall thickness and to form a locking lip 74 for a purpose to be described.

The support assembly 10 also includes an insert member 80 adapted to be inserted in and held by the sleeve 16. This insert member is generally cylindrical and includes a front end 84 and a rear end 88 (FIG. 1). The front end of the insert may be considered to be a viewing window or the like, and this portion extends rearwardly with its outer wall 92 having a substantially constant thickness to a point where the wall is undercut to provide a lip 94. This lip is adapted to engage the front end wall or lip 28 of sleeve 16. Rearwardly of lip 94, the wall decreases uniformly in thickness, with the taper being provided by having outer wall 96 slanted toward the axis of the insert member 20. The rearward end of the tapered wall portion terminates in a ring or key 98 of somewhat larger diameter than the adjacent portions of the insert. This ring is adapted to engage the lip 74 in the inner wall of the sleeve 16.

Rearwardly of the ring 98, the wall of member 80 extends rearwardly at substantially constant thickness to its rear open end 88 (FIG. 1) which is adapted to receive and secure an electrical or mechanical component 100, for example, a pilot light, and its support 104. The support 104 carries terminals 105 for making contact with the leads 107 of component 100. To this end, the inner surface 106 of the member 80 near the rear end 88 is tapered in thickness and is provided with an annular notch 110 which is adapted to receive a complementary ring 114 on support 104. The support 104 has a tapered wall 115 which mates with the tapered wall 106 of member 80, and it has a ledge 118 which abuts the end wall 120 of member 80 which defines its rear open end.

In using the support member of the invention described above, the sleeve 16 is inserted into a suitable opening 124 in panel 20, with the front end lip 28 engaging the top surface of the panel and the tapered walls of portions 40 and 54 providing a locking action on the material of the panel surrounding the opening therein. The insert member 80 is inserted into the sleeve, and, as it is so inserted, the tapered wall portion 92′ causes the sleeve 16 to expand, the expansion being facilitated by the slots 36 therein. The insert member is inserted until the lip 94 thereof engages the front end 28 of the sleeve 16 and the ring 98 engages the lip 74 in the sleeve. At this time, it can be seen that the tapered wall 92′ of the insert is exerting a straightening or flexing force on the wall of portions 40 and 54 of the sleeve 16, thereby causing it to enlarge in diameter and thus to more firmly grasp the panel. At the same time, this portion, as it is flexed, more securely engages the lip 94 and ring 98 of the insert 80.

Figure 2:
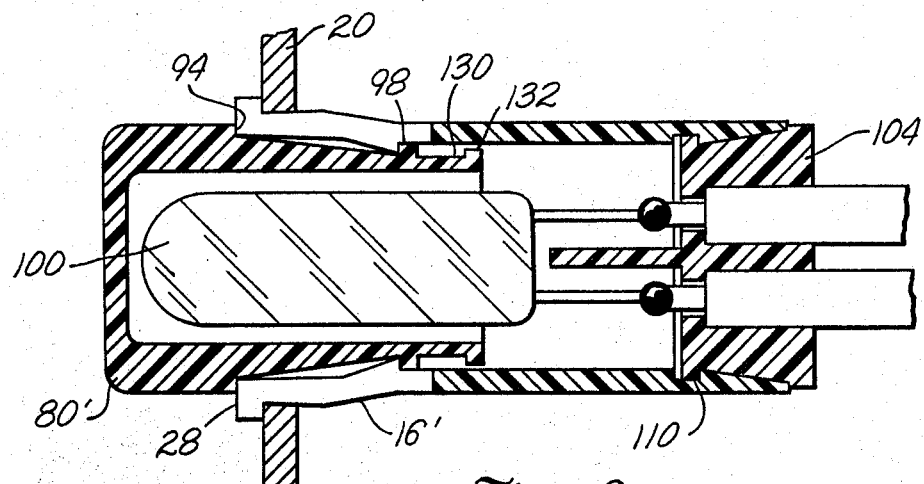
FIG. 2 is a sectional, elevational view of the apparatus of the invention with a portion thereof modified.

In a modification of the invention shown in FIG. 2, the sleeve 16' is identical to the sleeve of FIGS. 1 and 3 except that the sleeve 16' is elongated and is provided with the rear end structure of insert member 80 which itself is shortened. The sleeve 16' thus is designed to receive the component 100 and its support 104. The apparatus of FIG. 2 includes an insert member 80' which is a modification of member 80 of FIGS. 1 and 3. The member 80' is identical to member 80 from the front end 84 rearwardly to ring 98. However, rearwardly from ring 98, the member 80' includes a length of wall 130 of uniform thickness which terminates in a ring 132 of somewhat larger diameter which defines the rear open end of member 80'.

The purpose of the modified insert member 80' is to facilitate shipping of the apparatus and subsequent insertion in a panel. To this end, when the assembly is to be shipped, the insert member 80' is inserted in the sleeve 16 or 16' with ring 132 engaging lip 74 on the inner wall of sleeve 16'. The insert 80' and sleeve 16 thus form an assembly which can be handled, packaged, and shipped with ease. However, the flexibility of the wall of the sleeve 16 is still retained, and the sleeve can still be inserted in a panel 20. After this has been done, then the insert 80' is inserted to its full locked position with ring or lip 98 engaging lip 74.

Another embodiment of the invention, shown in FIG. 7, utilizes a sleeve 16 or 16' with a modified insert member 80" which is formed in two parts as shown. Insert 80" is esentially the same as insert 80 or 80' with the viewing window portion formed as a separate member. The insert member 80" includes a front open end defined by a lip or flange 136 which may be metal-coated, if desired, and which is adapted to contact the lip 28 which defines the front end of sleeve 16. Rearwardly of the lip 136, the insert 80" includes a tapered wall portion 92', as in FIG. 1, which terminates in lip 98' which is adapted to engage lip 74 formed in the inner wall of sleeve 16 for a purpose to be described.

The insert 80" is provided with a removable viewing member 150 of plastic or the like which is adapted to be inserted into the open end of insert 80". The member 150 includes at one end a viewing window 154 from which a first straight wall portion 158 and then a tapered wall portion 180 extend to the rear open end 184. The tapered wall portions 158 and 180 define a lip 188 which is adapted to engage the rim 136 of the insert 80", and, at its rear end, tapered wall portion 180 terminates in a lip 190 which defines the rear open end of member 150. The lip 190 is adapted to be seated in the annular notch 144 formed in the inner surface of the wall 92". With this arrangement, the viewing member can be firmly but removably engaged in the member 130.

It is clear that any suitable materials can be used for the various parts of the housings described above. It is customary to use synthetic resinous materials for these parts. In addition, of course, the housings described can be used to house any type of component.

What is claimed is:
1. A housing for a component including
a generally cylindrical sleeve including means in its wall for permitting the sleeve to expand and contract in diameter to accommodate other apparatus with which it is mated,
said sleeve having an open front end defined by an annular surface,
said sleeve having a wall having an inner surface,
an annular lip formed in said inner surface of the wall of said sleeve and spaced from said open front end,
a generally cylindrical insert adapted to be inserted in said sleeve and having a wall having inner and outer surfaces,
first and second annular lips formed spaced apart in the outer surface of the wall of said insert,
the wall of said insert between said first and second lips being tapered in thickness so that when the insert is inserted in the sleeve, it tends to expand the sleeve, and when the insert is fully inserted in the sleeve, said first lip engages the front end surface of said insert and said second lip engages the annular lip in the inner surface of the wall of said sleeve and mutually interacting locking forces are applied by the sleeve and insert on each other, these forces also tending to lock the insert securely in place when it is mounted in an opening in a panel.

2. The housing defined in claim 1 wherein at least a portion of the wall of the sleeve betwen said open front end and said annular lip is tapered in thickness to act cooperatively with the tapered wall of the insert to provide mutual locking forces.

3. The housing defined in claim 1 and including means coupled to said sleeve for supporting a component therein.

4. The housing defined in claim 1 and including means coupled to said insert for supporting a component therein.

5. The housing defined in claim 1 wherein said insert includes a viewing window through which a component carried by the housing may be viewed.

6. The housing defined in claim 1 wherein said insert includes an open front end and a viewing window locked in place in said open front end of said insert, said window permitting a component carried by the housing to be viewed.

7. The housing defined in claim 1 wherein said insert includes an open rear end and further including a support member carrying a component and locked in engagement with said rear end of said insert.

8. The housing defined in claim 1 wherein said insert includes an open rear end and further including a support member carrying a component and locked in engagement with said rear end of said insert,
said insert and said support member having cooperating notch and ring construction for locking them together.

9. The housing defined in claim 1 wherein said insert includes in the outer surface of its wall an auxiliary annular lip adapted to engage the annular lip in the surface of the wall of the sleeve when the insert is only partially inserted in said sleeve and before the sleeve is mounted in a panel.

10. A housing for a component including
a generally cylindrical sleeve including means in its wall for permitting the sleeve to expand and contract in diameter to accomodate other apparatus with which it is mated,
said sleeve having an open front end defined by an annular surface,
said sleeve having a wall having an inner surface,
a first locking means formed in said inner surface of the wall of said sleeve and spaced from said open front end,
a generally cylindrical insert adapted to be inserted in said sleeve and having a wall having inner and outer surfaces,
second and third locking means formed spaced apart in the outer surface of the wall of said insert,
the wall of said insert between said second and third locking means being tapered in thickness so that when the insert is inserted in the sleeve, it tends to expand the sleeve, and when the insert is fully inserted in the sleeve, said second locking means engages the front end surface of said insert and said second locking means engages said first locking means in the inner surface of the wall of said sleeve and mutually interacting locking forces are applied by the sleeve and insert on each other, these forces also tend to lock the insert securely in place when it is mounted in an opening in a panel.

References Cited by the Examiner
UNITED STATES PATENTS

| | | | |
|---|---|---|---|
| 2,592,130 | 4/1952 | Erb et al. | 174—163 |
| 3,213,189 | 10/1965 | Mitchell et al. | 174—138 |
| 3,217,319 | 11/1965 | Rueger | 340—381 |

FOREIGN PATENTS

| | | |
|---|---|---|
| 1,221,728 | 6/1960 | France. |
| 832,148 | 4/1960 | Great Britain. |

CLAUDE A. LE ROY, *Primary Examiner.*

J. F. FOSS, *Assistant Examiner.*